US012774258B2

(12) United States Patent
Banhos et al.

(10) Patent No.: US 12,774,258 B2
(45) Date of Patent: Oct. 27, 2026

(54) REINFORCING FIBERS FOR USE IN CERAMIC MATRIX COMPOSITES, METHODS OF MANUFACTURE AND ARTICLES COMPRISING THE SAME

(71) Applicant: RTX Corporation, Farmington, CT (US)

(72) Inventors: Jonas S. Banhos, Rocky Hill, CT (US); Russell Kim, Glastonbury, CT (US); James T. Roach, Vernon, CT (US)

(73) Assignee: RTX CORPORATION, Farmington, CT (US)

( * ) Notice: Subject to any disclaimer, the term of this patent is extended or adjusted under 35 U.S.C. 154(b) by 224 days.

(21) Appl. No.: 17/554,419

(22) Filed: Dec. 17, 2021

(65) Prior Publication Data

US 2023/0192568 A1 Jun. 22, 2023

(51) Int. Cl.
*C04B 41/45* (2006.01)
*C04B 41/51* (2006.01)

(52) U.S. Cl.
CPC .......... *C04B 41/4596* (2013.01); *C04B 41/51* (2013.01)

(58) Field of Classification Search
CPC ........ B32B 7/08; C04B 41/51; C04B 41/4596
See application file for complete search history.

(56) References Cited

U.S. PATENT DOCUMENTS 9,726,025 B2 * 8/2017 Lazur ........................ F01D 5/14
10,961,979 B2 3/2021 Garm et al.
11,001,532 B2 * 5/2021 Shim ..................... C04B 35/565
11,021,779 B2 * 6/2021 Barrett ....................... B32B 3/26
11,680,488 B2 * 6/2023 Dyson ..................... F01D 9/065 415/177
2005/0118392 A1 * 6/2005 Millard ................... C04B 35/14 428/131
2008/0261474 A1 10/2008 Goering
2018/0312950 A1 11/2018 Barrett et al.
2019/0145269 A1 5/2019 Campbell
2023/0203727 A1 * 6/2023 Mukherjee ............. D04H 3/115 428/113

OTHER PUBLICATIONS

Extended European Search Report for EP Application No. 22211792.1; Report mail date May 4, 2023, 10 pages.

* cited by examiner

*Primary Examiner* — Michael A Tolin
*Assistant Examiner* — Hana C Page
(74) *Attorney, Agent, or Firm* — CANTOR COLBURN LLP

(57) ABSTRACT

Disclosed herein is a method of reinforcing a composite comprising determining a location of a first cooling hole in a plurality of plies; where a cooling gas is transported through the cooling hole; disposing a z-fiber in the plurality of plies at a location proximate to where the first cooling hole will be located; where the z-fiber enters the plurality of plies at either an upper surface or a lower surface; and where the z-fiber traverses a portion of the plurality of plies in the z-direction proximate to the first cooling hole; and traverses the plurality of plies in an x or y direction further away from the first cooling hole; where the z-direction is in the thickness direction of the plurality of plies and where the x and y-direction are perpendicular to the z-direction.

11 Claims, 6 Drawing Sheets

REINFORCING FIBERS FOR USE IN CERAMIC MATRIX COMPOSITES, METHODS OF MANUFACTURE AND ARTICLES COMPRISING THE SAME

BACKGROUND

This disclosure relates to reinforcing fibers for use in ceramic matrix composites, methods of manufacture thereof and articles comprising the same. In particular, the reinforcing fiber is used to reinforce the region around cooling holes in ceramic matrix composites.

Preforms are used for the fabrication of ceramic matrix composite (CMC) structures using chemical vapor infiltration (CVI), polymer infiltration pyrolysis (PIP) and melt infiltration (MI). A preform generally comprises a plurality of plies which are made from a fabric. The fabric comprises fibers, which can be unidirectional or woven (e.g., plain weave, 5 Harness Satin Weave, 8 Harness Satin Weave, twill). These fibers are often manufactured from ceramics Chemical vapor infiltration (CVI) is a ceramic engineering process whereby matrix material is infiltrated into fibrous preforms by the use of reactive gases at elevated temperature to form fiber-reinforced composites. CVI can be applied to the production of carbon-carbon composites and ceramic-matrix composites. Chemical vapor infiltration (CVI) can potentially be used at temperatures of up to and greater than 2700° F. Polymer infiltration pyrolysis (PIP) comprises the infiltration of a low viscosity polymer into the fiber structure, followed by pyrolysis. Under pyrolysis, the polymer precursor is heated in an inert atmosphere and transformed into a ceramic due to its decomposition. Melt infiltration is based on the infiltration of porous matrices with the melt of an active phase or precursor. These ceramic matrix composites are used in a variety of high temperature applications such as turbine blades, vanes, and so on.

When used in such a gas turbine, the ceramic matrix composite can be subjected to high temperatures and extreme thermal gradients. The high temperatures and stress caused by the extreme thermal gradient can lead to a breakdown in the ceramic matrix composite component. In order to reduce the stress and prevent overheating, cooling holes are often used in the ceramic matrix composite components. The cooling hole permits the transport of cooling gases through the component. Cooling gases reduce the temperature of the components and prevent the formation of large steep thermal gradients which can eventually lead to a reduction in the life cycle of the component.

Such cooling holes are often machined (via techniques such as drilling, milling, laser, and the like) into the surface of the ceramic matrix composite to allow cooling air to circulate through. This air circulation reduces the stress and provides better temperature control. The machining involves the application of a high amount of stress on the fibers of the ceramic matrix composite, often resulting in cracks in the ceramic matrix composite around the resulting cooling hole. These cracks can propagate in some form, often linking up with cracks in other nearby cooling holes to create larger cracks in the ceramic matrix composite. Cracks can result in additional damage to the composite which is undesirable. These cracks can cause poor performance, ultimately reducing the service life of the component.

SUMMARY

Disclosed herein is a method of reinforcing a composite comprising determining a location of a first cooling hole in a plurality of plies; where a cooling gas is transported through the cooling hole; disposing a z-fiber in the plurality of plies at a location proximate to where the first cooling hole will be located; where the z-fiber enters the plurality of plies at either an upper surface or a lower surface; and where the z-fiber traverses a portion of the plurality of plies in the z-direction proximate to the first cooling hole; and traverses the plurality of plies in an x or y direction further away from the first cooling hole; where the z-direction is in the thickness direction of the plurality of plies and where the x and y-direction are perpendicular to the z-direction.

In an embodiment, the z-fiber traverses the entire plurality of plies in the z-direction proximate to the first cooling hole.

In an embodiment, the z-fiber traverses the entire plurality of plies in the z-direction proximate to the first cooling hole prior to traversing the plurality of plies in the x and/or y-direction.

In an embodiment, the z-fiber traverses the plurality of plies in the x-direction or the y-direction in between two plies.

In an embodiment, the z-fiber traverses the plurality of plies in the x-direction or the y-direction on an outer surface of the plurality of plies.

In an embodiment, the z-fiber penetrates the plurality of plies from the outer surface in a periodic manner.

In an embodiment, the z-fiber penetrates the plurality of plies from the outer surface in an aperiodic manner.

In an embodiment, the method further comprises drilling the cooling holes after the z-fiber is woven into the plurality of plies.

In an embodiment, the method further comprises disposing a ceramic precursor into the composite to form a ceramic matrix composite.

In an embodiment, the disposing of the ceramic precursor into the composite occurs after the cooling holes are drilled.

In an embodiment, the method further comprises removing a machine tool from the composite from the ceramic matrix composite to leave behind a reinforced cooling hole.

In an embodiment, the disposing of the ceramic precursor into the composite comprises chemical vapor infiltration, polymer infiltration pyrolysis or melt infiltration.

In an embodiment, the method further comprises disposing a plurality of z-fibers in the plurality of plies, wherein each z-fiber traverses the plurality of plies in the z-direction proximate to a cooling hole location.

Disclosed herein is an article comprising a preform comprising a plurality of plies; a ceramic matrix encompassing the preform; wherein the preform comprise one or more cooling holes; and a z-fiber disposed in the preform proximate to the cooling holes; where the z-fiber traverses a portion of the plurality of plies in the z-direction proximate to the one or more cooling holes; and traverses the plurality of plies in an x or y direction further away from the one or more cooling holes; where the z-direction is in the thickness direction of the plurality of plies and where the x and y-direction are perpendicular to the z-direction.

In an embodiment, the z-fiber traverses the plurality of plies in the x-direction or the y-direction in between two plies.

In an embodiment, the z-fiber traverses the plurality of plies in the x-direction or the y-direction on an outer surface of the plurality of plies.

In an embodiment, the z-fiber penetrates the plurality of plies from the outer surface in a periodic manner.

In an embodiment, the z-fiber penetrates the plurality of plies from the outer surface in an aperiodic manner.

In an embodiment, the z-fiber traverses the entire plurality of plies in the z-direction proximate to the one or more cooling holes.

In an embodiment, the article is a turbine blade.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
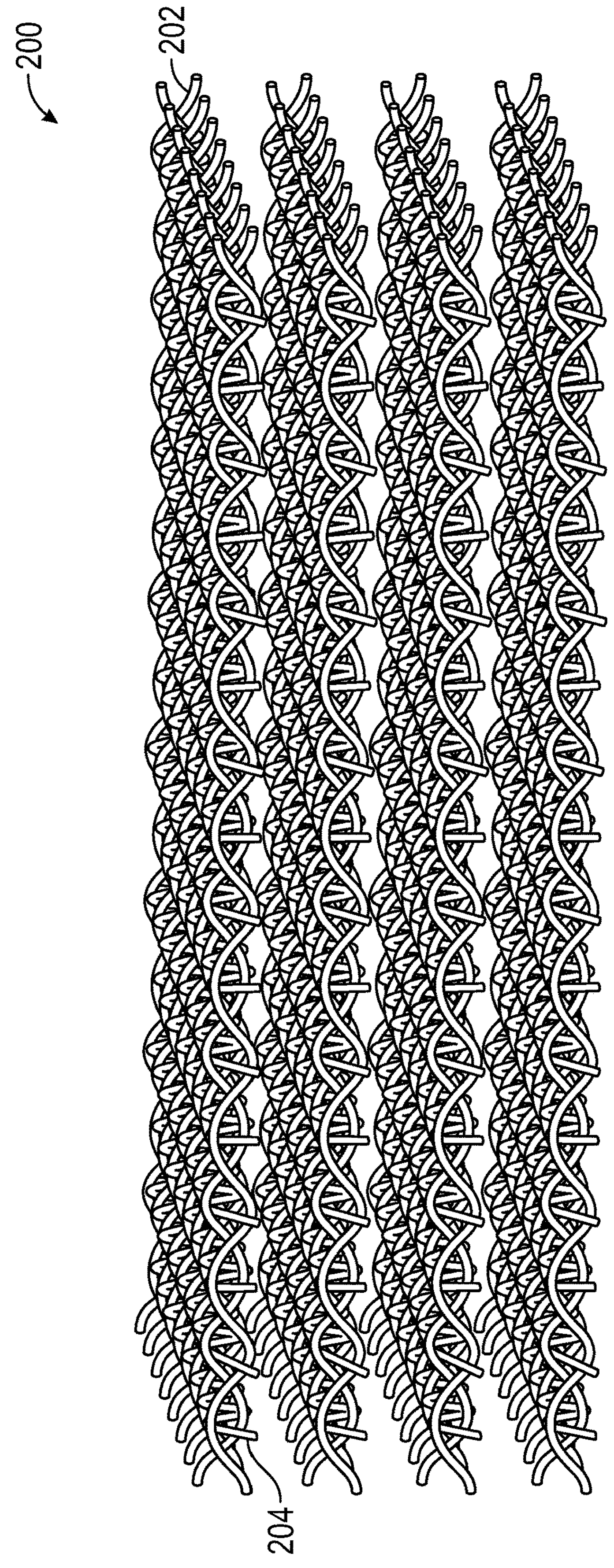
FIG. 1 is a side view of a preform that comprises four 2-dimensional plies without cooling holes.

A detailed description of one or more embodiments of the disclosed apparatus and method are presented herein by way of exemplification and not limitation with reference to the Figures.

Disclosed herein is a ceramic composite matrix that comprises a fiber reinforcement in regions of the composite proximate to a cooling hole. Disclosed herein too is a method that comprises adding 3-D z-fiber tows that are woven at precise distances of an intended cooling hole row arrangement during the formation of a CMC preform. After densification, holes would be drilled between the z-fibers. This methodology is advantageous in that it adds a strengthening mechanism to the surrounding hole region to prevent crack linkage between holes. In this method, precise spacing and hole size guidelines are determined prior to layup of the preform.

As noted above, current airfoil design incorporated cooling holes machined (e.g., drilled, slotted, and the like) into the CMC material in order to alleviate thermal stresses generated during operation. However, these drilled cooling holes may themselves act as stress concentrators due to fiber breakage and rupture that may occur during the machining operation. The stress concentration created may significantly impact the life of the part where cooling hole fatigue stress cracks initiate at locations leading to further "linking" of cracks and possibly component failure. It is therefore desirable to strengthen the region around cooling holes to prevent crack linkage between holes and consequently increase life cycle of the component. Cooling gases are transported through the cooling holes to reduce the temperature of the components and prevent the formation of large steep thermal gradients, which can eventually lead to a reduction in the life cycle of the component.

The method comprises weaving 3-D z-fibers tows into a zone where intended cooling holes are to be machined (e.g., via drilling, slotting, milling, and the like) at. Z-fibers are typically fibers added in the through-thickness direction of an article or component prior to densification of the precursors (that eventually form the ceramic matrix). Fibers placed in the thickness direction are called z-fibers, z-yarn, warp weaver, or binder yarn for 3D woven fabrics. More than one layer of fabric is woven at the same time, and the z-fibers interlaces warp and fill yarns of different layers during the process. At the end of the weaving process, an integrated 3D woven structure, which has a considerable thickness, is produced.

After densification holes would be drilled in the zone containing z-fibers. The weaving frequency would be as such that holes will be disposed in the vicinity of a z-fiber reinforced region hence decreasing the probably of a crack propagation and connectivity between holes. This methodology would add a strengthening mechanism to the region surrounding a hole and prevent crack linkage between holes. Precise parameters such zone definition, weaving frequency and z-fiber tow size guidelines are determined prior layup.

Figure 2A:
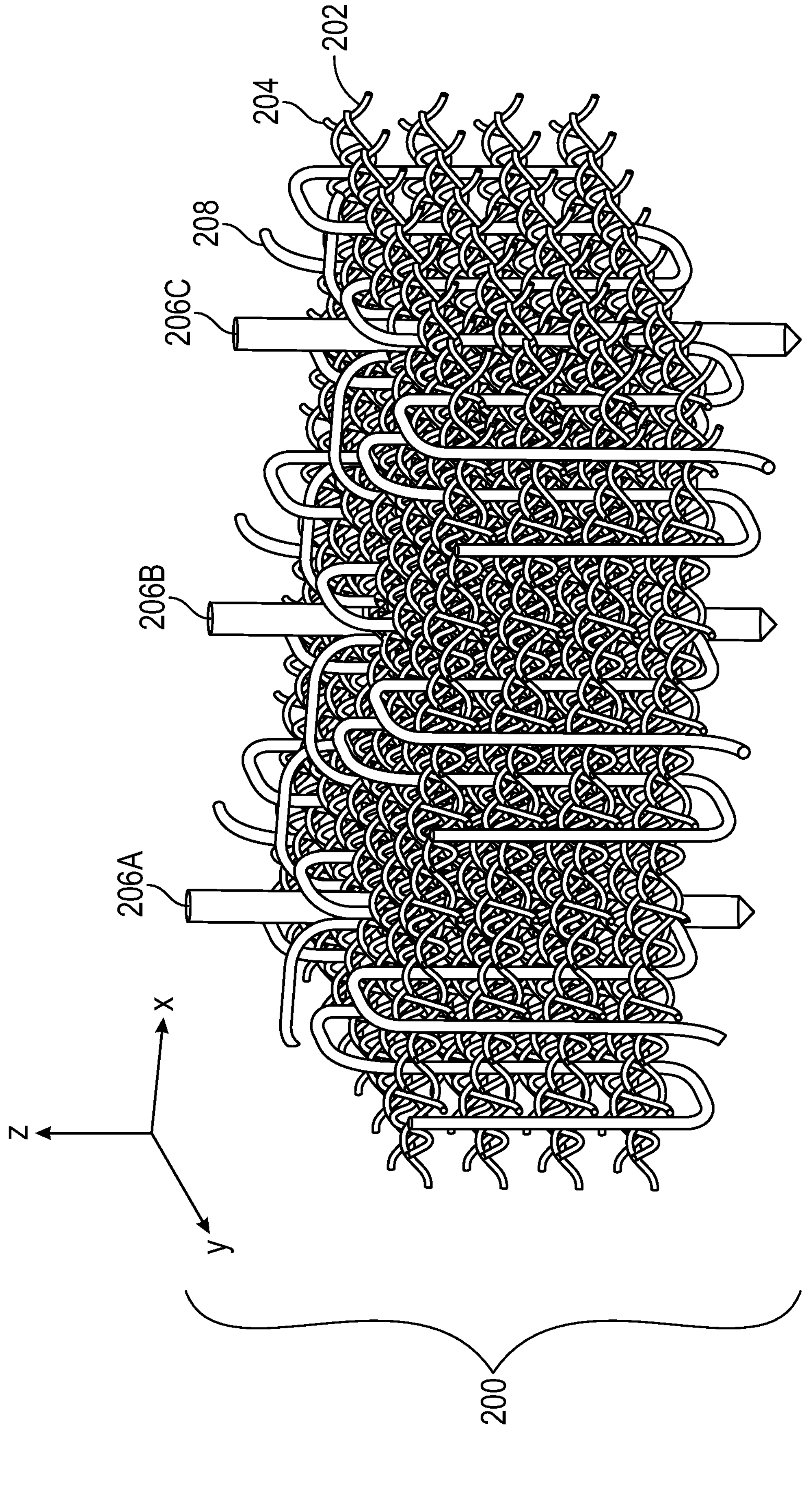
FIG. 2A is an isometric side view of the preform with the z-fibers woven around the cooling holes.
Figure 2B:
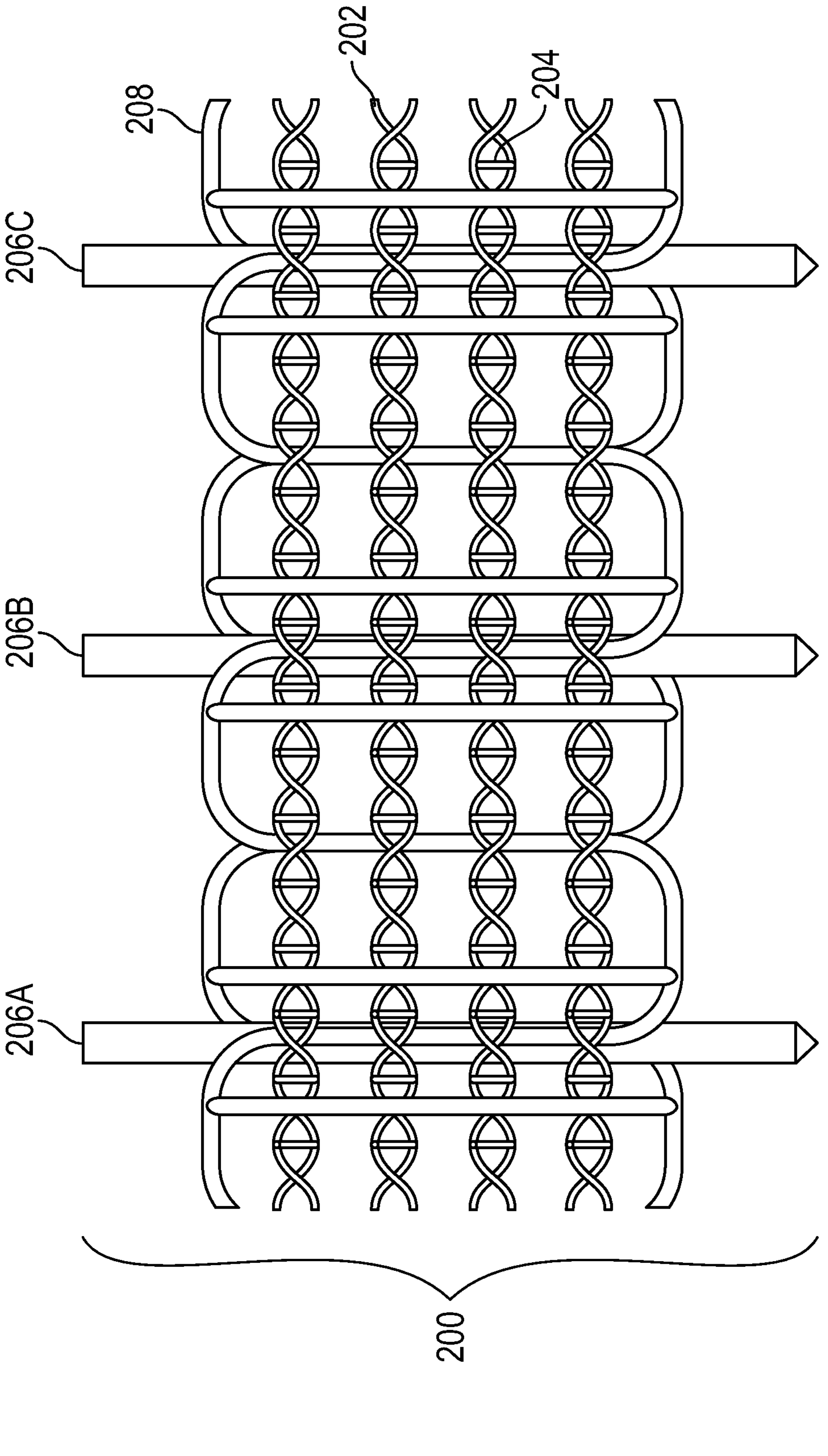
FIG. 2B is a side view of the preform with the z-fibers woven around the cooling holes.

FIG. 1 depicts an exemplary collection of 4 2-D (2-dimensional) plies 200 (hereinafter a "plurality of plies") that have no cooling holes drilled in them. The plurality of plies comprise warp fibers 202 interwoven with fill fibers 204 that are woven to form a ply. FIGS. 2A and 2B depict the predetermined location of cooling holes around which the z-fibers are woven to reinforce the plurality of plies of the FIG. 1. FIG. 2A is an exemplary isometric view of the plurality of plies 200 of the FIG. 1, with drill bits 206A, 206B and 206C located at the places that the cooling holes will eventually be drilled. As may be seen in the FIG. 2A, the z-fibers 208 are woven through the plurality of plies to reinforce regions around the to-be drilled cooling holes.

FIG. 2B is a side side view depiction of a portion of the z-fiber reinforced plurality of plies 200 which contains 3 drill bits—a first drill bit 206A, a second drill bit 206B and a third drill bit 206C, where each of these drill bits represents a location at which a cooling hole (a first cooling hole, a second cooling hole and a third cooling hole respectively) will be machined. While the FIG. 2B depicts a drill bit as a place holder for the cooling hole, any other component that has an exterior profile that is similar to the inner diameter of the cooling hole and can withstand the manufacturing temperatures may be used to eventually produce the cooling hole. From the FIGS. 2A and 2B, it may be seen that the z-fibers either enter the plurality of plies or exit the plurality of plies at a distance proximate to where the drill bit 206 will be used to drill the cooling holes.

The z-fibers enter the plurality of plies and traverse the plurality of plies 200 along the z-axis (which represents the thickness of the plies) that is typically concentric to the cooling hole drilled in the plurality of plies. In an embodiment, only a single z-fiber may traverse the thickness of the plurality of plies 200 (in the z-direction) at a region close to where the hole is to be drilled. In another embodiment, two or more z-fibers may traverse the thickness of the plurality of plies 200 at a region proximate to where the hole is to be drilled. In yet another embodiment, three or more z-fibers may traverse the thickness of the plurality of plies 200 at a region proximate to where the hole is to be drilled. In an embodiment, the z-fibers may be symmetrically located or asymmetrically located about the cooling hole. A symmetrical arrangement implies that if the plurality of plies are cut along the z axis (the longitudinal axis) at a location where a drill bit is placed, then the image on one side of the drill bit is a mirror image of the other side of the drill bit.

The z-fibers may be woven through the entire thickness of the plurality of plies (as depicted in the FIG. 2B) or partially through the thickness of the plurality of plies (not shown). In the FIG. 2B, each z-fiber enters the plurality of plies at the bottom and traverses the entire group of plies to emerge at the top proximate the point at which the first cooling hole (as represented by the first drill bit 206A) will be drilled or alternatively, enters the plurality of plies at the top and traverses the entire group of plies to emerge at the bottom proximate the point at which the cooling hole will be drilled. Each fiber then respectively traverses the upper or lower surface of the plurality of plies and then re-enters the plurality of plies at the point proximate to where the next cooling hole is to be drilled. In the FIG. 2A, it may be seen that the z-fibers traverses the surface of the plurality of plies in the x-direction, in the y-direction or in both the x and y-directions. The z-direction is the thickness direction of the plurality of plies, while the x and y-directions are perpendicular to the z-direction.

While the FIGS. 2A and 2B depict the z-fiber as travelling through the entire plurality of plies in the z-direction, the z-fibers can be woven through only a portion of the plurality of plies in the z-direction (not shown). In an embodiment, a portion of the the z-fibers (used to reinforce the composite ply proximate to a drilled hole) can be woven through 25% or less of the plurality of plies. In another embodiment, a portion of the the z-fibers (used to reinforce the composite ply proximate to a drilled hole) can be woven through 50% or less of the plurality of plies. In yet another embodiment, a portion of the the z-fibers (used to reinforce the composite ply proximate to a drilled hole) can be woven through 75% or less of the plurality of plies.

Figure 3A:
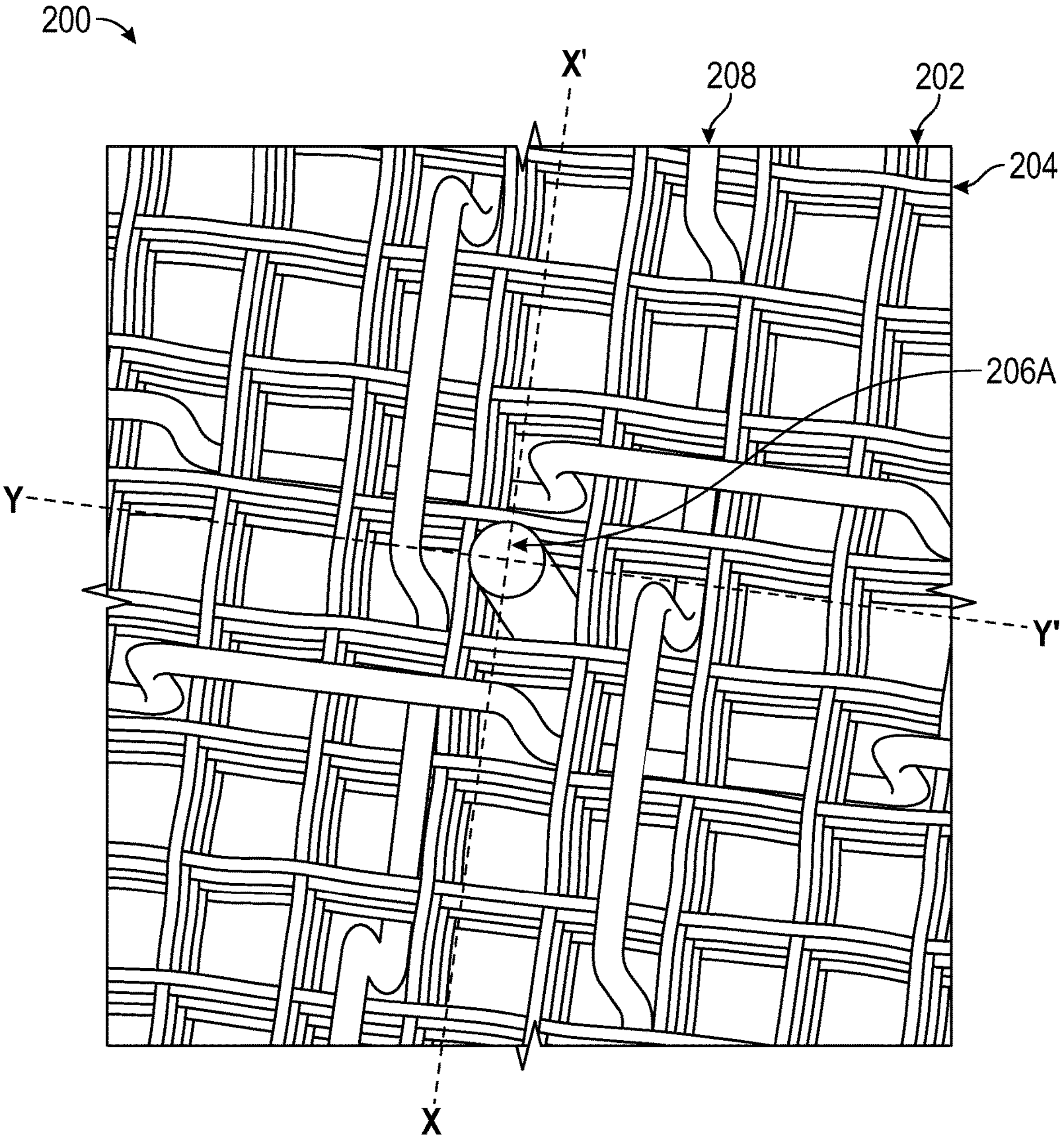
FIG. 3A is a top isometric view of a preform with the z-fibers woven around the cooling holes in a symmetrical alternating arrangement.

As noted above, the z-fibers may be symmetrically distributed through the ply around the to-be drilled cooling hole. FIG. 3A depicts an isometric top view of the plurality of plies 200 where the z-fibers are symmetrically distributed about drill bit 206A when viewed on either side of the section along XX' or YY'. If the plurality of plies are cut along the z axis (the longitudinal axis) along section XX' or YY', then the image on one side of the drill bit 206A (the location at which the cooling hole will eventually be drilled) is a mirror image of the other side of the drill bit. When the z-fibers are symmetrically distributed about the drill bit 206A, the respective z-fibers typically enter the ply at equal distances from the location at where the cooling hole is to be drilled. FIG. 3A also shows the z-fibers arranged in an alternating arrangement. Travelling clock-wise around the drill bit 206A, it may be seen that each of the z-fibers in succession enter from the bottom of the plurality of plies and travel to the top of the plurality of plies. This arrangement may be varied such that one or more of the z-fibers may travel from the top of the plurality of plies to the bottom of the plurality of plies, while the remaining z-fibers travel in the opposite direction from bottom to top.

Figure 3B:
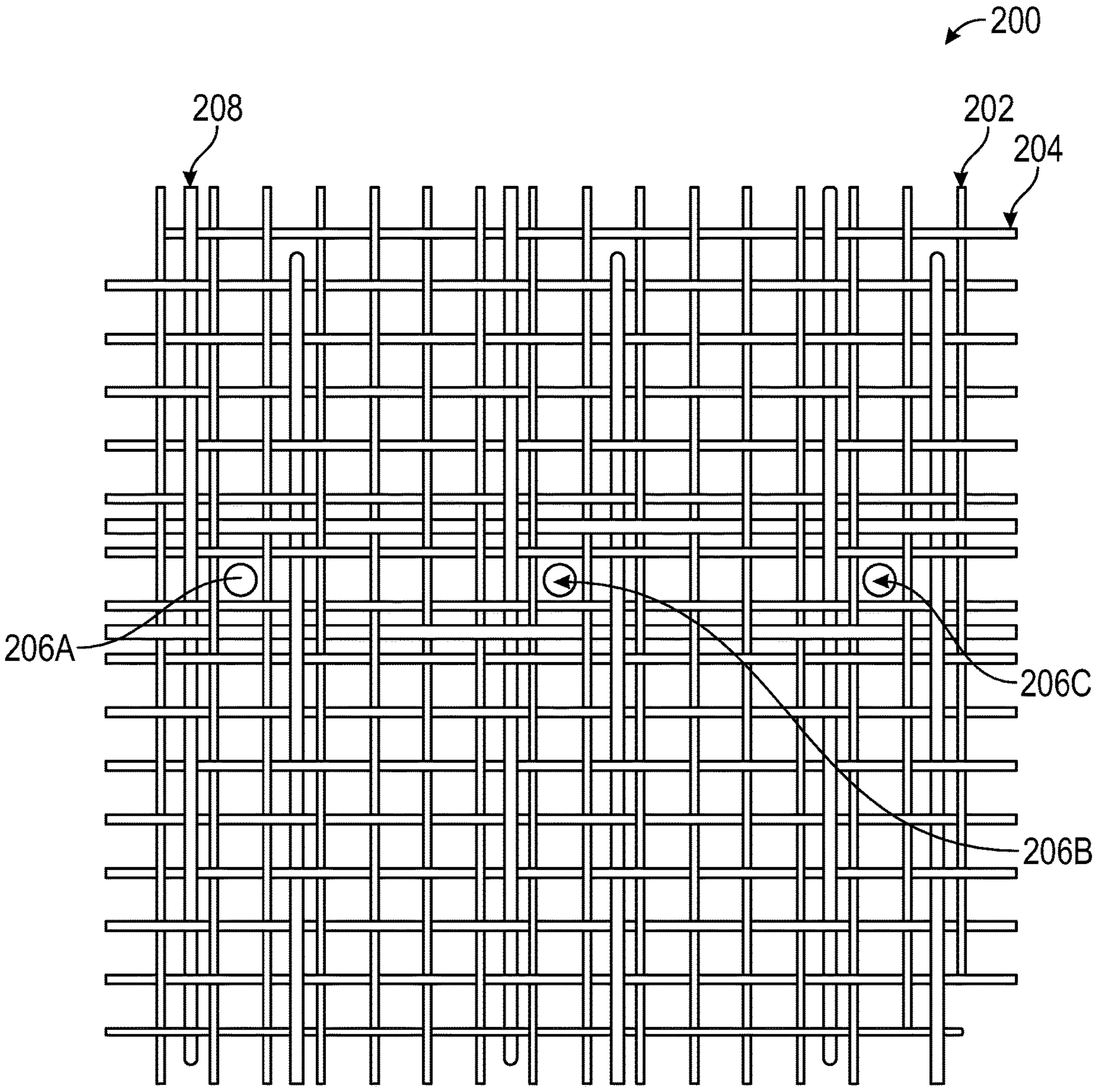
FIG. 3B is a top view of a preform with the z-fibers woven around the cooling holes.

FIG. 3B is another top view of plurality of plies 200 shown in the FIGS. 2A and 2B. FIG. 3B provides a better view of the symmetrical layout of the z-fibers around each of the drill bits 206A, 206B and 206C. From the FIGS. 3A and 3B it may be seen that the drill bits are periodically spaced and the z-fibers follow a square wave function in the z and y direction. The number of z-fibers and the periodicity of the z-fibers determine the amount of reinforcement of the plies around the drill bit. It is to be noted that while the figures depict the square wave function in the z and y directions, any other combination of directions (e.g., x and y or x and z) are also possible. The periodicity varies with the stiffness of the ply. As periodicity increases the ply may be less stiff, while as periodicity decreases the ply becomes more stiff. It is to be noted that while the FIG. 3A depicts the z-fibers as being normal to the surface of the plurality of plies, this may not always be the case. Some of the z-fibers may be inclined to the surface of the plurality of plies. In an embodiment, there are many different types of z-fiber stitching patterns that may be implemented here (e.g., cross, running, whip, ladder, or the like, or a combination thereof). The z-fiber comprises one or more tows that can have one or more filaments. In an embodiment, a tow can comprise up to 500 filaments. In an embodiment, the z-fiber comprises 2 to 10 tows each of which comprise 5 to 20 filaments.

As may be seen from the FIGS. 2A. 2B, 3A and 3B, the method of reinforcing a ceramic matrix composite comprises determining a location of a first cooling hole in a plurality of plies. A first z-fiber is disposed in the plurality of plies at a location proximate to where the first cooling hole (or where the cooling holes) will be located; where the z-fiber enters the plurality of plies at either an upper surface or a lower surface. The z-fiber traverses the plurality of plies in the z-direction proximate to the first cooling hole and traverses the plurality of plies in an x or y direction further away from the first cooling hole. The z-direction is in the thickness direction of the plurality of plies and where the x and y-direction are perpendicular to the z-direction.

The z-fiber typically traverses the plurality of plies in the z-direction proximate to the cooling holes and traverses the plurality of plies in the x-direction, the y-direction or both the x and y-direction when located further away from the cooling holes. The z-fiber may also traverse the plurality of plies in the z-direction at locations that are not proximate to the cooling hole. In an embodiment, the z-fiber traverses the plurality of plies in the x-direction or the y-direction in between two plies (i.e., in the interior of the plurality of plies). In an embodiment, the z-fiber traverses the plurality of plies in the x-direction or the y-direction on an outer surface of the plurality of plies. In another embodiment, the z-fiber penetrates the plurality of plies from an outer surface in a periodic manner. In another embodiment, the z-fiber penetrates the plurality of plies from an outer surface in an aperiodic manner.

Figure 4:
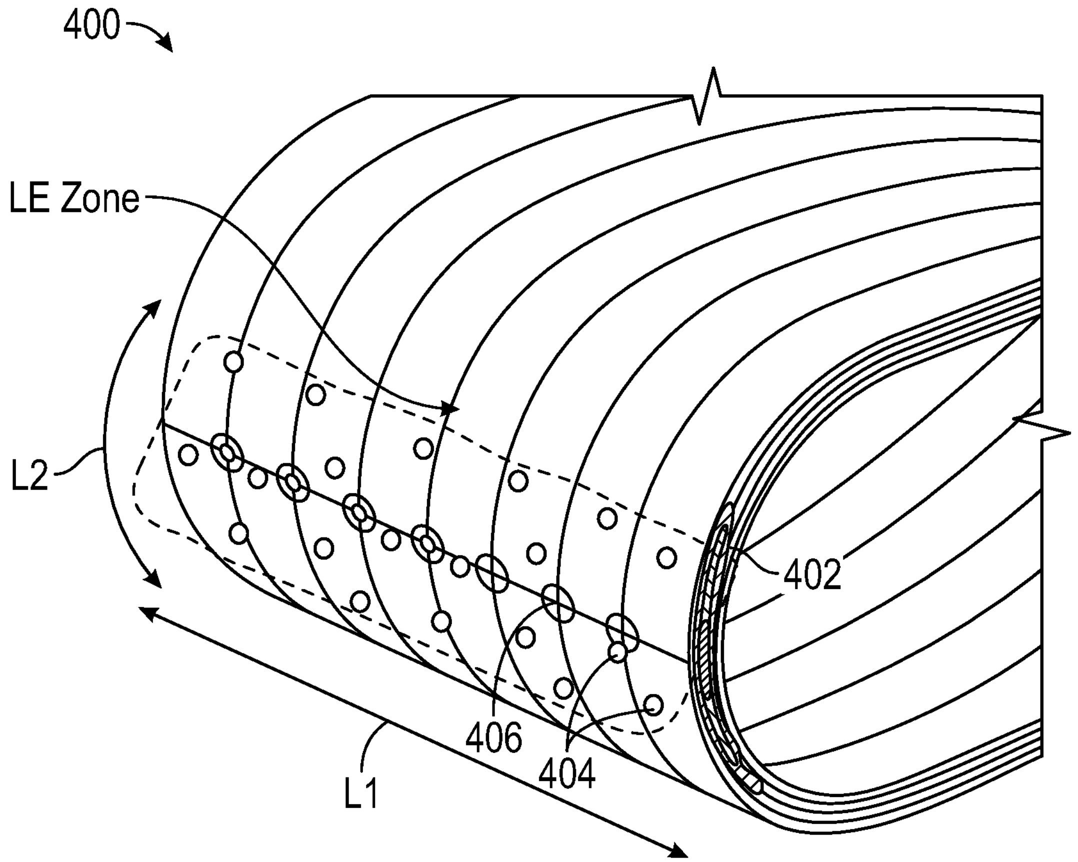
FIG. 4 is a isometric view of the leading edge of an airfoil with cooling holes that are surrounded by z-fibers.

FIG. 4 depicts the use of z-fibers in the leading edge of a turbine blade. FIG. 4 represents a leading edge of an airfoil 400 of length L1 and radius of curvature L2, where a region 402 that comprises cooling holes 406 and non-cooling hole 404. The cooling holes 406 are present horizontally at a tip of the leading edge. The non-cooling holes 404 represent a possible zone of z-fiber locations and an example of a distributed spread of z-fibers around a region of interest. Due to discrepancies in final z-fiber location (after CVI) in reference to the intended drilled hole location, a larger area of the airfoil may be needed to be populated with z-fibers to increase the likelihood that final drilled holes may lie between z-fibers. The FIG. 4 shows more or less 3 rows of z-fiber holes (the non-cooling holes 404) and their placement variation. The center airfoil line shows intended cooling hole locations (406).

In one embodiment, in one method of manufacturing a component with cooling holes, the location of the cooling holes is first determined. The cooling holes are generally located between warp and fill fibers so as to preferably not disturb the fibers. The location of the z-fibers is also determined prior the layup process. The plies are layed up and the z-fibers are woven into the layup prior to precursor infiltration. After the z-fibers are woven into the layup, the layup is subjected to precursor infiltration. After precursor infiltration, the machine tool (used to form the cooling hole, such as, for example, a drill bit) is removed leaving behind a cooling hole.

Precursor infiltration may be conducted via chemical vapor infiltration, polymer infiltration pyrolysis or melt infiltration. Chemical vapor infiltration (CVI) is a ceramic engineering process whereby matrix material is infiltrated into fibrous preforms by the use of reactive gases at elevated temperature to form fiber-reinforced composites. CVI can be applied to the production of carbon-carbon composites and ceramic-matrix composites. Chemical vapor infiltration (CVI) can potentially be used at temperatures of up to and greater than 2700° F. Polymer infiltration pyrolysis (PIP) comprises the infiltration of a low viscosity polymer into the fiber structure, followed by pyrolysis. Under pyrolysis, the polymer precursor is heated in an inert atmosphere and transformed into a ceramic due to its decomposition. Melt infiltration is based on the infiltration of porous matrices with the melt of an active phase or precursor.

After the densification of the precursors has occurred, the cooling holes are drilled into the ply. Z-fiber reinforcement is advantageous for its ability to increase the through-the-thickness strength of advanced composite laminates, joints and structural interfaces.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of reinforcing a composite comprising:

determining a location of where a first cooling hole and a second cooling hole is to be located in a plurality of plies; where the first cooling hole and the second cooling hole are configured to transport a cooling gas;

disposing a first z-fiber and a second z-fiber in the plurality of plies at a location proximate to where the first cooling hole or the second cooling hole is located; wherein the first z-fiber and the second z-fiber are located on a concentric circumference to the first cooling hole or the second cooling hole; where the first z-fiber enters the plurality of plies in a periodic manner at either an upper surface or a lower surface and the second z-fiber enters the plurality of plies in a periodic manner at a surface opposite to the upper surface or the lower surface of which the first z-fiber entered;

where the first z-fiber traverses a portion of the plurality of plies in the z-direction proximate to the first cooling hole; and traverses the plurality of plies in an x- or y-direction further away from the first cooling hole; where the z-direction is in the thickness direction of the plurality of plies and where the x and y-direction are perpendicular to the z-direction; where the first z-fiber enters the plurality of plies at the bottom, or alternatively at the top, and traverses the plurality of plies to emerge at the top, or respectively at the bottom, proximate the point at which the first cooling hole will be located; and then traverses the upper surface, or respectively the lower surface, in the x-direction and then re-enters the plurality of plies to emerge at the bottom, or respectively the top, and then traverses the lower surface, or respectively the upper surface, in the x-direction of the plurality of plies;

where the second z-fiber enters the plurality of plies at the bottom, or alternatively at the top, and traverses the plurality of plies to emerge at the top, or respectively the bottom, proximate the point at which the first cooling hole will be located and then traverses the upper surface, or respectively lower surface, in the y-direction, and then re-enters the plurality of plies to emerge at the bottom, or respectively at the top, an then traverses the lower surface, or respectively top surface, in the y-direction of the plurality of plies; and drilling the first cooling hole and the second cooling hole after introduction of the first and the second z-fibers.

2. The method of claim 1, wherein the first z-fiber traverses the entire plurality of plies in the z-direction proximate to the first cooling hole.

3. The method of claim 2, wherein the first z-fiber traverses the entire plurality of plies in the z-direction proximate to the first cooling hole prior to traversing the plurality of plies in the x-direction.

4. The method of claim 1, wherein the first z-fiber traverses the plurality of plies in the x-direction or the y-direction in between two plies.

5. The method of claim 1, wherein the first z-fiber traverses the plurality of plies in the x-direction or the y-direction on an outer surface of the plurality of plies.

6. The method of claim 1, wherein the first z-fiber penetrates the plurality of plies from the outer surface in a periodic manner defined by a square wave function.

7. The method of claim 1, wherein the first z-fiber penetrates the plurality of plies from the outer surface in an aperiodic manner.

8. The method of claim 1, further comprising disposing a ceramic precursor into the composite to form a ceramic matrix composite.

9. The method of claim 8, further comprising removing a machine tool from the ceramic matrix composite to leave behind the first cooling hole or the second cooling hole, where the first cooling hole is reinforced or the second cooling hole is reinforced.

10. The method of claim 8, wherein the disposing of the ceramic precursor into the composite comprises chemical vapor infiltration, polymer infiltration pyrolysis or melt infiltration.

11. The method of claim 8, further comprising disposing a plurality of first z-fibers in the plurality of plies, wherein each first z-fiber traverses the plurality of plies in the z-direction proximate to the location of the first cooling hole or to the location of the second cooling hole.

* * * * *